(12) United States Patent
Bacher (10) Patent No.: US 8,191,072 B2
(45) Date of Patent: May 29, 2012

(54) SYSTEM AND METHOD FOR SHIFTING WORKLOADS ACROSS PLATFORM IN A HYBRID SYSTEM

(75) Inventor: Utz Bacher, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 12/341,342

(22) Filed: Dec. 22, 2008

(65) Prior Publication Data

US 2010/0162252 A1 Jun. 24, 2010

(51) Int. Cl.
  *G06F 15/00* (2006.01)
  *G06F 15/76* (2006.01)
(52) U.S. Cl. .................................................. 718/106
(58) Field of Classification Search .................. None
See application file for complete search history.

(56) References Cited

U.S. PATENT DOCUMENTS

| | | | |
|---|---|---|---|
| 5,136,500 A * | 8/1992 | Lemay et al. | 709/214 |
| 5,887,165 A * | 3/1999 | Martel et al. | 713/100 |
| 6,339,819 B1 * | 1/2002 | Huppenthal et al. | 712/16 |
| 6,434,628 B1 | 8/2002 | Bowman-Amuah | |
| 6,961,941 B1 | 11/2005 | Nelson et al. | |
| 7,003,593 B2 | 2/2006 | Huppenthal et al. | |
| 7,028,312 B1 | 4/2006 | Merrick et al. | |
| 7,200,840 B2 | 4/2007 | Gschwind et al. | |
| 2004/0172629 A1 | 9/2004 | Tene et al. | |
| 2010/0161976 A1 | 6/2010 | Bacher | |
| 2010/0162252 A1 | 6/2010 | Bacher | |

OTHER PUBLICATIONS x86 Linux Application Consolidation on Power Systems Platforms Using IBM Virtualization Technologies. IBM Corporation 2008. Whitepaper dated Jan. 29, 2008. 10 pages.

U.S. Appl. No. 12/341,301, filed Dec. 22, 2008.
U.S. Appl. No. 12/342,704, filed Dec. 23, 2008.
Karimi, K. et al., "Transparent Distributed Programming under Linux," High-Performance Computing in an Advanced Collaborative Environment, 2006, HPCS 2006. 20th International Symposium on, vol. No., pp. 13, May 14-17, 2006 (as city in PTO-892 of Office Action (Mail Date Aug. 16, 2011) U.S. Appl. No. 12/341,301).
Office Action (Mail Date Aug. 16, 2011) for U.S. Appl. No. 12/341,301, filed Dec. 22, 2008.
Zhou et al.; Heterogeneous distributed shared memory, Parallel and Distributed Systems, IEEE Transactions on, vol. 3, No. 5, pp. 540-554, Sep. 1992.
Office Action (Mail Date Dec. 27, 2011) for U.S. Appl. No. 12/342,704, filed Dec. 23, 2008.
Final Office Action (Mail Date Jan. 20, 2012) for U.S. Appl. No. 12/341,091, filed Dec. 22, 2008.

* cited by examiner

*Primary Examiner* — Corey S Faherty (74) *Attorney, Agent, or Firm* — Schmeiser, Olsen & Watts; Cynthia G. Seal (57) ABSTRACT

A system and associated method for shifting workloads across platform in a hybrid system. A first kernel governing a first platform of the hybrid system starts a process that is executable in a second platform of the hybrid system. The first kernel requests a second kernel governing the second platform to create a duplicate process of the process such that the process is executed in the second platform. The process represents the duplicate process in the first platform without consuming clock cycles of the first platform. During an execution of the duplicate process in the second platform, the first kernel services an I/O request of the duplicate process that is transferred from the second kernel to the first kernel. When the duplicate process is terminated, the process in the first platform is removed first before the duplicate process releases resources.

20 Claims, 5 Drawing Sheets

FIG. 1

METHOD FOR SHIFTING WORKLOADS ACROSS PLATFORM IN HYBRID SYSTEM

SYSTEM AND METHOD FOR SHIFTING WORKLOADS ACROSS PLATFORM IN A HYBRID SYSTEM

FIELD OF THE INVENTION

The present invention discloses a system and associated method for efficiently combining high-end mainframe systems and lower-end server systems to provide stable and cost-effective computing environments.

BACKGROUND OF THE INVENTION

Conventional hosting environments employ multiple types of platforms. For mission-critical applications, a high-end mainframe is desirable to provide stable and robust service. Computationally intensive workload that has lower reliability requirements can either be executed on separate distributed systems, resulting in additional and costly management effort, or executed on the mainframe in a less cost-efficient way, but limited management effort.

To retain cost-effectiveness of the execution environment for computation-intensive workload while limiting management effort, there is a need for a system and associated method that cost-effectively executes computation-intensive workloads in a computing environment with multiple platforms with different architectures.

SUMMARY OF THE INVENTION

The present invention provides a method for shifting workloads across platform in a hybrid system, the method comprising:

starting a process in a first platform of the hybrid system, wherein the process is executable in the second platform of the hybrid system, wherein a first kernel governs the first platform and a second kernel governs the second platform;

detecting that the process is not executable in the first platform;

requesting the second kernel to create, in the second platform, a duplicate process of the process in the first platform and receiving a notification that the duplicate process had been successfully created in the second platform from the second kernel;

stopping scheduling the process in the first platform responsive to receiving a signal from the second kernel indicating that the second platform schedules and executes the duplicate process in the second platform;

terminating the process in the first platform upon receiving an event trigger to terminate the process; and sending the second kernel a termination signal indicating that the process in the first platform has been removed, wherein said starting, said detecting, said requesting, said stopping, said terminating and said sending are performed by the first kernel.

The present invention provides a computer program product, comprising a computer usable storage medium having a computer readable program code embodied therein, said computer readable program code containing instructions that when executed by a processor of a computer system implement a method for shifting workloads across platform in a hybrid system, the method comprising:

starting a process in a first platform of the hybrid system, wherein the process is executable in the second platform of the hybrid system, wherein a first kernel governs the first platform and a second kernel governs the second platform;

detecting that the process is not executable in the first platform;

requesting the second kernel to create, in the second platform, a duplicate process of the process in the first platform and receiving a notification that the duplicate process had been successfully created in the second platform from the second kernel;

stopping scheduling the process in the first platform responsive to receiving a signal from the second kernel indicating that the second platform schedules and executes the duplicate process in the second platform;

terminating the process in the first platform upon receiving an event trigger to terminate the process; and sending the second kernel a termination signal indicating that the process in the first platform has been removed, wherein said starting, said detecting, said requesting, said stopping, said terminating and said sending are performed by the first kernel.

The present invention provides a computer system comprising a processor and a computer readable memory unit coupled to the processor, said memory unit containing instructions that when executed by the processor implement a method for shifting workloads across platform in a hybrid system, the method comprising:

starting a process in a first platform of the hybrid system, wherein the process is executable in the second platform of the hybrid system, wherein a first kernel governs the first platform and a second kernel governs the second platform;

detecting that the process is not executable in the first platform;

requesting the second kernel to create, in the second platform, a duplicate process of the process in the first platform and receiving a notification that the duplicate process had been successfully created in the second platform from the second kernel;

stopping scheduling the process in the first platform responsive to receiving a signal from the second kernel indicating that the second platform schedules and executes the duplicate process in the second platform;

terminating the process in the first platform upon receiving an event trigger to terminate the process; and sending the second kernel a termination signal indicating that the process in the first platform has been removed, wherein said starting, said detecting, said requesting, said stopping, said terminating and said sending are performed by the first kernel.

The present invention provides a method and system that overcomes at least one of the current disadvantages of conventional method and system for executing a workload in a hybrid system.

DETAILED DESCRIPTION OF THE INVENTION

Figure 1:
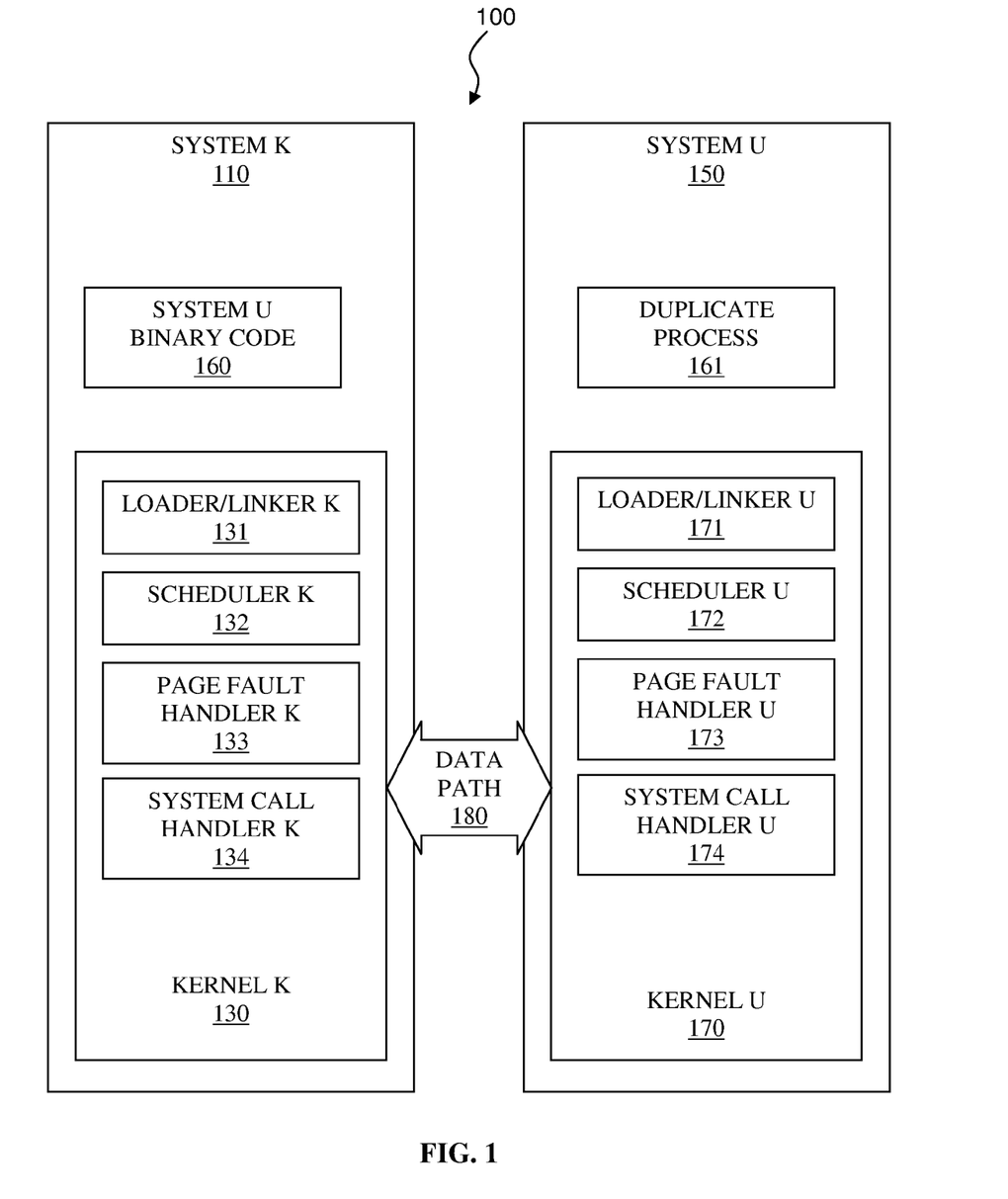
FIG. 1 illustrates a hybrid system for shifting workloads across platform, in accordance with embodiments of the present invention.

FIG. 1 illustrates a hybrid system 100 for shifting workloads across platform, in accordance with embodiments of the present invention.

The hybrid system 100 comprises at least one system U and a system K 110 that are interconnected through a data path 180. A system U 150 of said at least one system U is the lower-end server that is configured to primarily execute user applications that have computation-intensive workloads in the hybrid system 100. The system K 110 is the high-end mainframe that is configured to primarily execute kernel services for the hybrid system 100. The system K 110 and the system U 150 operate on a respective hardware platform and have a respective software environment that have convertible system calls for a respective kernel. The system K 110 and the system U 150 communicate with each other through the data path 180 that interconnects their respective kernels. The hybrid system 100 is configured to be perceived by users as a single system that provides functionalities and characteristics of both the system K 110 and the system U 150.

The system K 110 is configured to primarily execute kernel services for both the system K 110 and the system U 150 in the hybrid system 100. The system K 110 is employed in the hybrid system 100 to provide a stable and robust computing environment. The system K 110 also exhibit processes running in the hybrid system 100 for management purposes. The system K 110 comprises at least one user application K and a kernel K 130.

A system U binary code 160 is one of said at least one user application K. The system U binary code 160 is a user mode application of the system K 110 in a format executable in the system U 150. The system U binary code 160 comprises instructions that incur computation-intensive workloads to execute. The hybrid system 100 executes the system U binary code 160 by duplicating the system U binary code 160 onto the system U 150 for an execution without consuming resources of the system K 110. See descriptions of FIGS. 2A and 2B, infra, for details on the execution.

The kernel K 130 is a main part of an operating system that controls the system K 110. The operating system provides services such as, inter alia, time/clock related services, memory management services, process management services including scheduling, termination, and signalling, data services such as file/file system operations, network operations, and I/O calls, debugging and logging functionalities, inter-process communication (IPC) services without a shared memory, memory sharing services, I/O synchronizations, system administration services, and hardware services, etc. Examples of the operating system may be, inter alia, Linux, UNIX®, etc. (UNIX is a registered trademark of X/Open Company Ltd., in the United States and other countries.)

The kernel K 130 comprises a loader/linker K 131, a scheduler K 132, a page fault handler K 133, and a system call handler K 134, which are functional components.

The loader/linker K 131 loads a binary code to memory areas of the system K 110 and links necessary library files for execution. The loader/linker K 131 examines the binary code for a format to determine whether the loaded binary code is executable in the system K 110.

The scheduler K 132 assigns priorities to processes for orderly execution. According to a respective priority assigned to a process, the process takes microprocessor clock cycles of the system K 110.

The page fault handler K 133 processes interrupts/exceptions caused by a page fault that occurs when a program attempts to access a page that is mapped in an address space but not loaded in a physical memory of the system K 110. The page fault handler K 133 invokes the loader/linker K 131 to load the faulted page.

The system call handler K 134 executes system calls requesting a kernel service provided by the kernel K 130. System calls are invoked by processes on the system K 110 and/or the system U 150.

In the hybrid system 100, the kernel K 130 services all I/O requests by means of system calls from both the system K 110 and the system U 130. Examples of the I/O device may be, inter alia, HiperSockets®, a direct access storage device (DASD), enterprise tape systems, etc. (HiperSockets is a registered trademark of International Business Machines Corporation in the United States and other countries.)

The system U 150 is the lower-end server that is configured to primarily execute user applications for both the system U 150 and the system K 110 in the hybrid system 100. The system U 150 is employed in the hybrid system 100 to provide a cost-effective computing environment by shifting computation-intensive workloads from the system K 110 to the system U 150.

The system U 150 comprises a duplicate process 161 and a kernel U 170. The kernel U 170 is a core of an operating system that controls the system U 150. The kernel U 170 comprises a loader/linker U 171, a scheduler U 172, a page fault handler U 173, and a system call handler U 174, which are functional components rather than physically separated units.

The duplicate process 161 is a process created in the system U 150 to execute the system U binary code 160 in the system K 110.

The kernel U 170 is a main part of an operating system that controls the system U 150. See description of the kernel K 130, supra, for services provided by the operating system.

The loader/linker U 171 loads a binary code to memory areas of the system U 150 and links necessary library files for execution. The loader/linker U 171 examines the binary code for a format to determine whether the loaded binary code is executable in the system U 150.

The scheduler U 172 assigns priorities to processes for orderly execution. According to a respective priority assigned to a process, the process takes microprocessor clock cycles of the system U 150.

The page fault handler U 173 processes interrupts/exceptions caused by a page fault that occurs when a program attempts to access a page that is mapped in an address space but not loaded in a physical memory of the system U 150. If a page fault occurs for a page in the duplicate process in the system U 150, the page fault handler U 173 requests the faulted page of the system U binary code 160 in the system K 110.

The system call handler U 174 handles system calls requesting kernel services that are invoked by processes on the system U 150. If a kernel service requested is a service provided by the kernel K 130, the system call handler U 174 requests the service to the kernel K 130 for remotely executing the system call. If a kernel service requested is configured to be provided by the kernel U 170, the system call handler U 174 locally executes the system call.

The data path 180 interconnects the kernel K 130 and the kernel U 170. The data path 180 directly connects the system K 110 and the system U 150 in a kernel level with a high-speed communication I/O device such as 10 Gigabit Ethernet.

In one embodiment of the present invention, the system U 150 is a blade server employing Intel® or AMD® processors and the system K 110 is an IBM® System z® mainframe. (Intel is a registered trademark of Intel Corporation in the United States and other countries; AMD is a registered trademark of Advanced Micro Devices, Inc in the United States and other countries; IBM and System z are registered trademarks of International Business Machines Corporation in the United States and other countries.) Both blade server and the mainframe employ the Linux operating system or other UNIX family OS. The hybrid system 100 maintains input/output capability of the mainframe to HiperSockets®, a direct access storage device (DASD), enterprise tape systems, etc.

(HiperSockets is a registered trademark of International Business Machines Corporation in the United States and other countries.)

The hybrid system 100 retains superior hardware stability and management features of the mainframe. The hybrid system 100 also executes computation intensive applications on the blade server to achieve cost effectiveness. The hybrid system 100 provides a unified view of all resources for all applications on both the mainframe and the blade server.

The hybrid system 100 may be employed in areas of, inter alia, dynamic web servicing, data mining, SAP® R/3 application serving, Domino® groupware processing, application servicing and Java® processing. (SAP is a registered trademark of SAP AG in the United States and other countries; Domino is a registered trademark of International Business Machines Corporation in the United States and other countries; Java is a registered trademark of Sun Microsystems, Inc., in the United States and other countries.)

Figure 2:
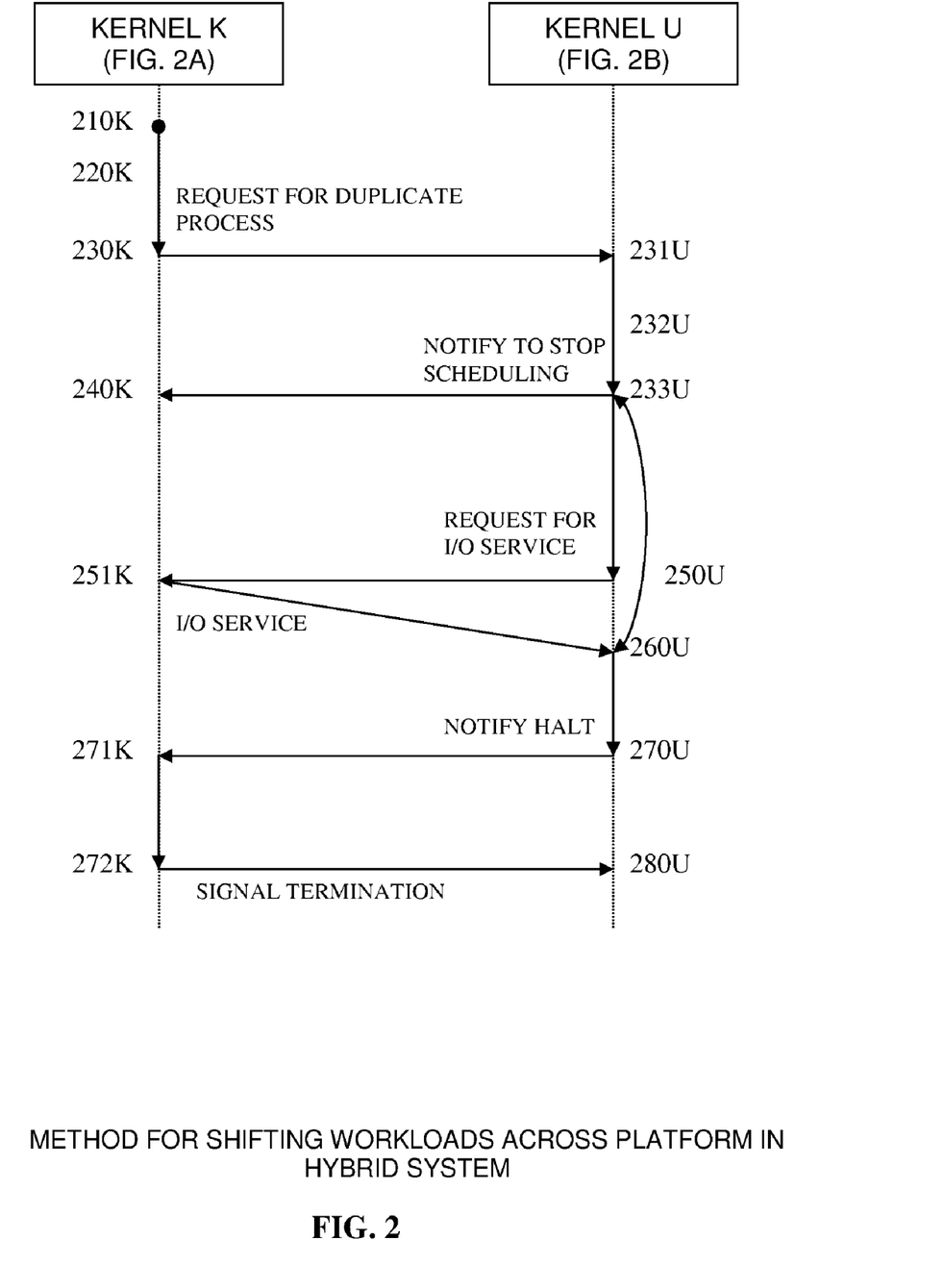
FIG. 2 is a control flow chart describing how the kernel K and the kernel U interoperate to shift workloads across platform in the hybrid system, in accordance with the embodiments of the present invention.

FIG. 2 is a control flow chart describing how the kernel K and the kernel U interoperate to shift workloads across platform in the hybrid system, in accordance with the embodiments of the present invention.

Figure 2A:
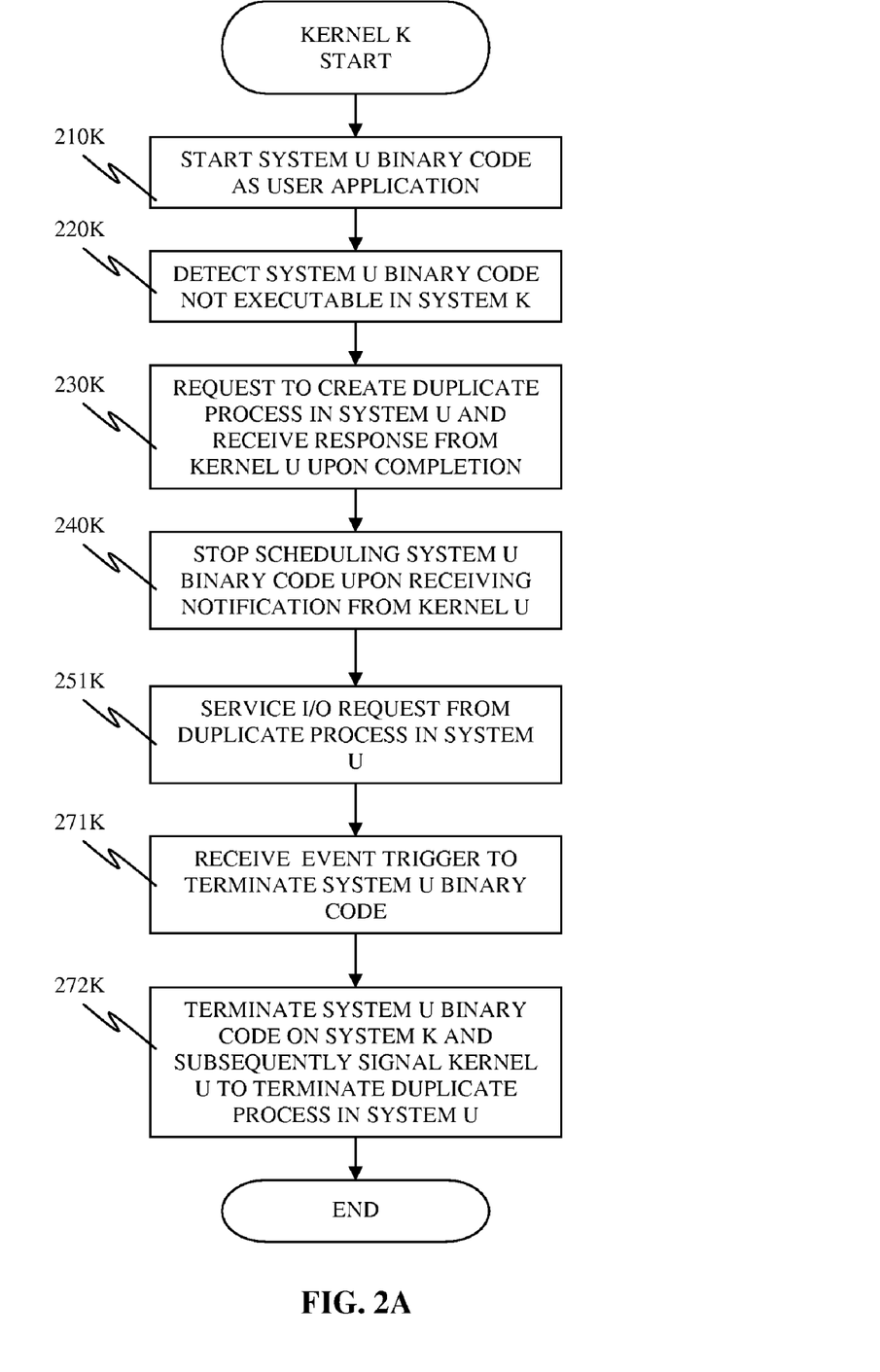
FIG. 2A is a flowchart depicting a method for shifting workloads across platform in the hybrid system that is performed by the kernel K, in accordance with the embodiments of the present invention.

See FIG. 2A, infra, for details of steps 210K, 220K, 230K, 240K, 251K, 271K, and 272K that are performed by the kernel K. See FIG. 2B, infra, for details of steps 231U, 232U, 233U, 250U, 260U, 270U, and 280U that are performed by the kernel U.

FIG. 2A is a flowchart depicting a method for shifting workloads across platform in the hybrid system that is performed by the kernel K, in accordance with the embodiments of the present invention.

Prior to step 210K, the system K identifies the system U and establishes a communication channel to the system U through the data path of FIG. 1, supra. The kernel K communicates with the kernel U to transfer data, to update system states, and to synchronize pages referenced in both the kernel K and the kernel U while executing the user application. During the page synchronization, a respective page fault handler in the kernel U and the kernel K marks a page as the validity of the page changes, and/or mirrors the page to a respective kernel of the other system upon accessing the page, etc.

In step 210K, the kernel K starts a user mode application comprising a system U binary code on the system K. The system U binary code is an executable format of a computer program that is configured to be executed on the computer architecture of the system U platform. The kernel K proceeds with step 220K.

In one embodiment of the present invention, the kernel K starts the system U binary code by forking a child process from a parent process that exists previously and then executing the system U binary code through the child process. To execute the system U binary code, the child process invokes exec ( ) or execve ( ) system call that loads and executes the system U binary code in the child process that had invoked the system call. After executing exec ( ) or execve ( ) system call, the thread of execution of the child process is replaced by instructions in the system U binary code.

In step 220K, the kernel K detects the system U binary code loaded in step 210K is not executable on the system K. The loader/linker K in the kernel K is called by the system call that had been invoked in step 210K to load the system U binary code. The loader/linker K detects that the system U binary code is incompatible with the computer architecture of the system K, but in a format executable in the system U. The kernel K proceeds with step 230K.

In step 230K, the kernel K requests the kernel U to create a duplicate process of the system U binary code on the system U and subsequently receives a response from the kernel U notifying that the kernel U completes the request. See the description of step 231U of FIG. 2B, infra, for operations performed by the kernel U upon receiving the request from the kernel K.

After the kernel K performed step 230K, the system U binary code in the system K and the duplicate process in the system U are linked to each other. The system U binary code and the duplicate process are reflected in a respective kernel context of the kernel K and the kernel U for execution. The kernel K proceeds with step 240K upon receiving a response from the system U, that the duplicate process has been successfully created.

Figure 2B:
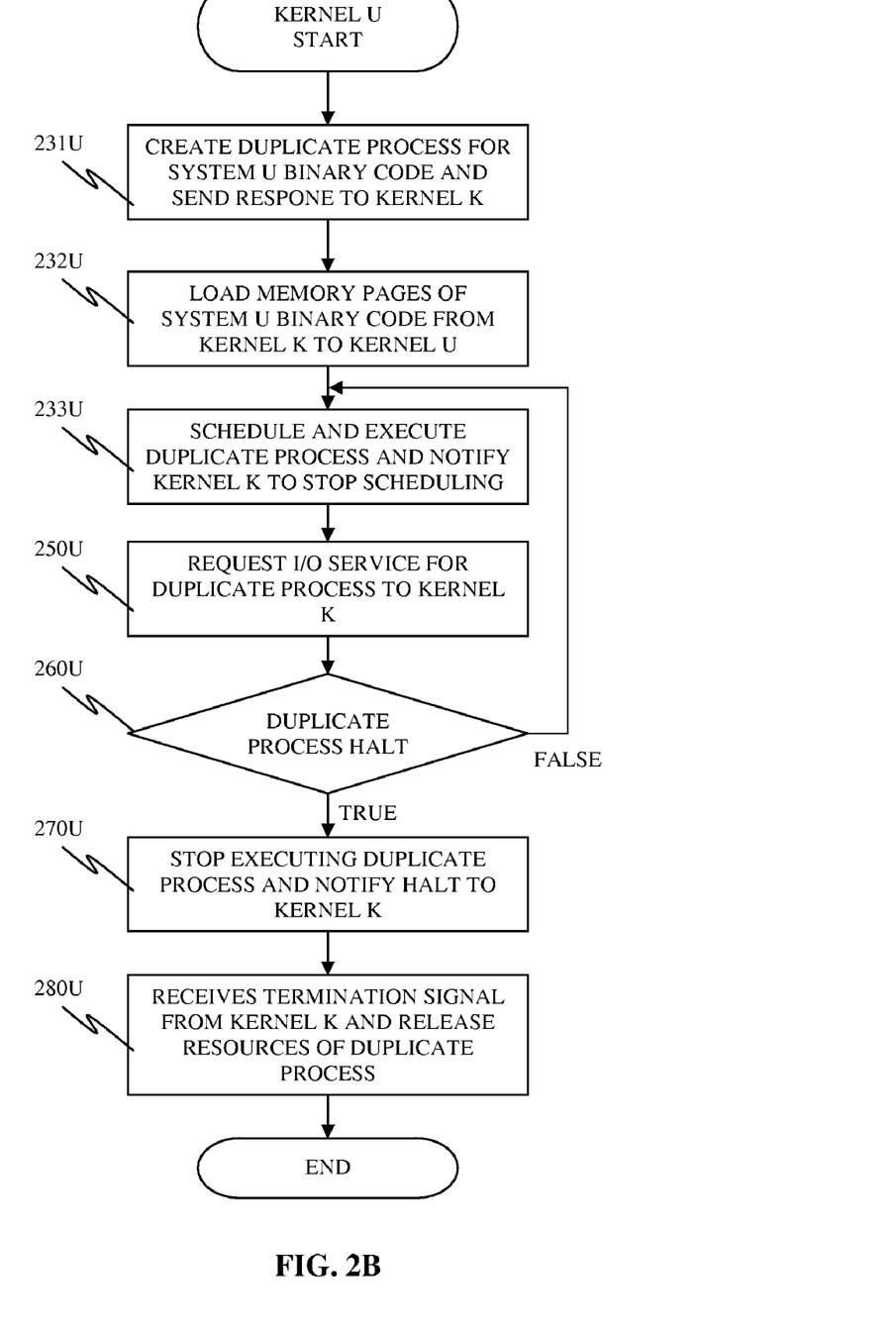
FIG. 2B is a flowchart depicting a method for shifting workloads across platform in the hybrid system that is performed by the kernel U, in accordance with the embodiments of the present invention.

In step 240K, the kernel K stops scheduling a process for the system U binary code upon receiving a notification from the kernel U performing step 233U of FIG. 2B, infra. After step 240K, the kernel K excludes the process that had loaded the system U binary code in the system K from scheduling and the thread of execution of the process in the system K stops. A process stub of the process resides in the system K to represent, within the kernel K, the duplicate process executing in the system U but the process stub does not waste clock cycles of the system K as being excluded from scheduling. Through the process stub, the kernel K manages the duplicate process running in the system U as if the duplicate process is a local process in the system K. The kernel K proceeds with step 251K upon receiving a request for an I/O service from the system U.

In step 251K, the kernel K services an input/output (I/O) request from the duplicate process in the system U upon receiving the I/O request to use I/O devices that are controlled by the system K. The kernel K receives the I/O request from the kernel U performing step 250U of FIG. 2B, infra. The kernel K repeats step 251K as many times as a number of I/O requests from the system U. After performing step 251K, the kernel K may receive another I/O request or a halt notification from the system U, that the duplicate process had been halted.

In step 271K, the kernel K receives an event trigger to terminate the process stub for the system U binary code in the system K. The event trigger may be, inter alia, a notification by the kernel U that the duplicate process in the system U had been halted, a "kill" command to terminate the process stub from a system administrator, etc. The kernel K proceeds with step 272K.

In step 272K, the kernel K terminates the process stub for the system U binary code in the system K and subsequently signals the kernel U to terminate the duplicate process on the system U. The kernel K terminates the process stub pursuant to a termination procedure for normal processes that may comprise, inter alia, a memory dump, notifying a parent process of the termination of the process, etc. Upon terminating the process stub successfully, the kernel K sends a signal to the system U that resources for the duplicate process may be released.

In one embodiment of the present invention, the system U is an Intel platform and the system K is a System z platform. In this embodiment, the kernel U is an operating system of the Intel platform, and the kernel K is an operating system of the System z. The user application created on the System z is an Intel binary code. The user application may also accompany libraries in an Intel binary form. When the Intel binary code on the System z is started, the operating system of the System z establishes a duplicate process on the Intel platform and instantiates the Intel binary code. System calls invoked from the Intel binary code while executing the Intel binary code may be remotely serviced on the System z.

FIG. 2B is a flowchart depicting a method for shifting workloads across platform in the hybrid system that is performed by the kernel U, in accordance with the embodiments of the present invention.

In step 231U, the kernel U creates a duplicate process for the system U binary code of the system K upon receiving the request to create duplicate process from the kernel K performing step 230K of FIG. 2A, supra. The kernel U also notifies the kernel K that the kernel U had successfully created the duplicate process in response to the request from the kernel K. The kernel U proceeds with step 232U.

In step 232U, the kernel U loads memory pages of system U binary code on the system K from the kernel K. The kernel U proceeds with step 233U.

In one embodiment of the present invention, the kernel U implements step 232U with the lazy loading method that defers initialization and/or loading of an object until the point at which it is needed. If the thread of execution reaches a memory area in the duplicate process that is not yet transferred from the kernel K to the kernel U, the execution is interrupted and a page fault occurs in the kernel U. In such cases, the page fault handler of system U loads the memory area that had caused the page fault, i.e., a missing page, from system K and resumes the execution of the process in kernel U.

In step 233U, the kernel U schedules and executes the duplicate process and notifies the kernel K to stop scheduling the system U binary code in the system K. After performing step 233U, the duplicate process is running in the system U on behalf of the system U binary code in the system K. As a result, typically computation-intensive workloads of the system U binary code in the system K are shifted to the system U. The kernel U proceeds with step 250U if an I/O service request is invoked from the duplication process during the execution. The kernel U may perform step 250U multiple times if the duplicate process invokes multiple I/O services during the execution. The kernel U may not perform step 250U and proceeds with step 260U if the duplicate process halts without ever invoking an I/O service request.

In step 250U, the kernel U requests zero or more I/O service for the duplicate process to the kernel K. While the duplication process is executing in the system U, the duplicate process requests an I/O service to the kernel U through a respective system call. The kernel U subsequently requests the I/O service to the kernel K because I/O devices are connected to and serviced by the system K in the hybrid system. Accordingly the respective system call for the I/O service is remotely executed in the system K instead of the system U.

In the 260U, the kernel U determines whether the duplicate process halted. The kernel U determines that the duplicate process halted by exception/interrupt invoked to the kernel U by the duplicate process. Thus while the duplicate process is still executing, the kernel U keeps performing steps 233U and 250U. If the kernel U determines that the duplicate process halted upon receiving the exception/interrupt indicating a halt of the duplicate process, the kernel U proceeds with step 270U.

While performing steps 233U and 250U, the kernel U keeps scheduling the duplicate process for an execution. I/O service requests of step 250U and the halt notification of step 260U are event-driven rather than sequential. Consequently, step 250U is performed when an I/O service request is made by the duplicate process.

In step 270U, the kernel U stops executing the duplicate process, and notifies the kernel K that the duplicate process halted. As the kernel U stops executing the duplicate process, the kernel U freezes status and context data of the duplicate process in a running stack of the kernel U. The kernel U proceeds with step 280U.

In step 280U, the kernel U receives a termination signal from the kernel K responsive to the halt notification sent by the kernel U in step 270U. The kernel U subsequently releases resources of the duplicate process after receiving the termination signal from the kernel K.

Figure 3:
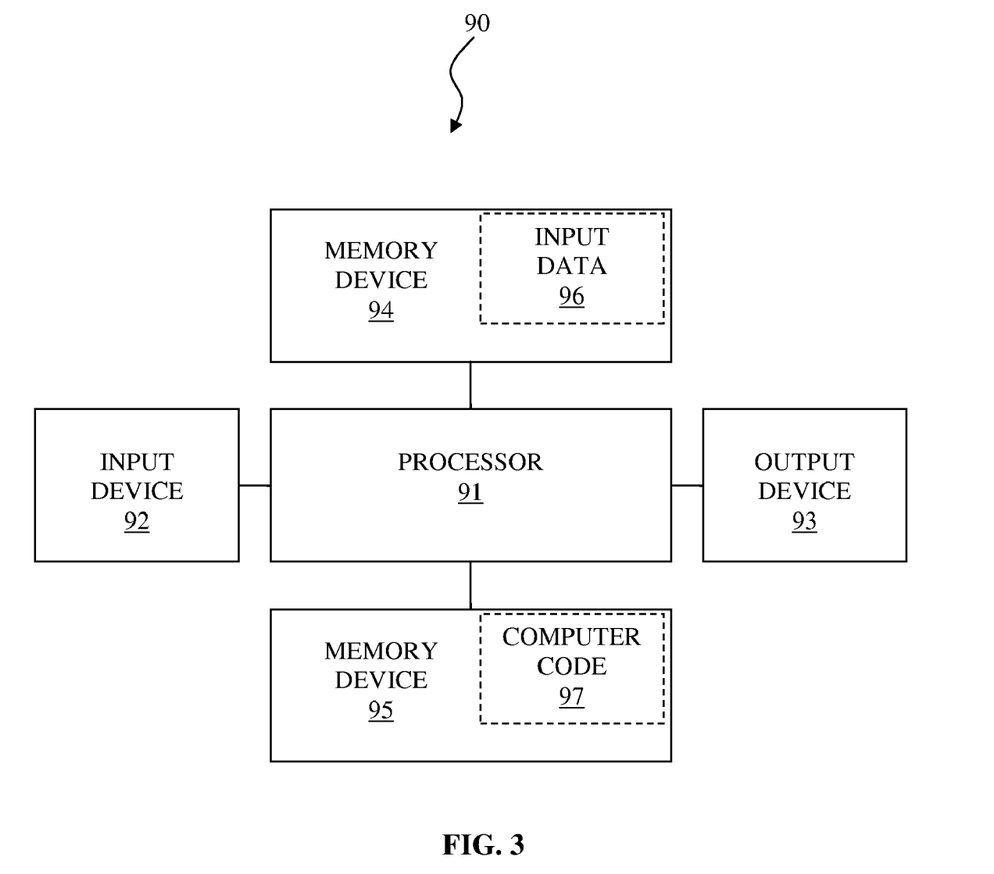
FIG. 3 illustrates a computer system used for shifting workloads across platform in the hybrid system, in accordance with embodiments of the present invention.

FIG. 3 illustrates a computer system 90 used for shifting workloads across platform in the hybrid system, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VoIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program that comprises computer-executable instructions. The computer code 97 includes, inter alia, an algorithm used for shifting workloads across platform in the hybrid system according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may be used as a computer usable storage medium (or a computer readable storage medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for shifting workloads across platform in a hybrid system, the method comprising:

starting a process in a first platform of the hybrid system, wherein the process is executable in the second platform of the hybrid system, wherein a first kernel governs the first platform and a second kernel governs the second platform;

detecting that the process is not executable in the first platform;

requesting the second kernel to create, in the second platform, a duplicate process of the process in the first platform and receiving a notification that the duplicate process had been successfully created in the second platform from the second kernel;

stopping scheduling the process in the first platform responsive to receiving a signal from the second kernel indicating that the second platform schedules and executes the duplicate process in the second platform;

terminating the process in the first platform upon receiving an event trigger to terminate the process; and sending the second kernel a termination signal indicating that the process in the first platform has been removed, wherein said starting, said detecting, said requesting, said stopping, said terminating and said sending are performed by the first kernel.

2. The method of claim 1, wherein said event trigger to terminate the process is selected from a group consisting of a halt notification and a kill command, wherein the halt notification is sent from the second kernel to indicate that the duplicate process in the second platform had halted, and wherein the kill command is received from a user of the hybrid system to terminate the process in the first platform.

3. The method of claim 1, the method further comprising:
subsequent to said stopping and prior to said terminating, servicing an input/output (I/O) service request made by the duplicate process that is executing in the second platform, wherein the I/O service request is directed to an I/O device that is coupled to the first platform and hosted by the first kernel, wherein the I/O service request is communicated by the second kernel to the first kernel, and wherein said servicing is performed by the first kernel.

4. The method of claim 1, the method further comprising:
responsive to said requesting, creating the duplicate process and subsequently sending the notification to the first kernel that the duplicate process had been successfully created in the second platform;
loading pages of the process in the first platform from the first kernel to the second kernel to execute the duplicate process in the second platform;
scheduling the duplicate process for execution and executing instructions of the duplicate process;
freezing data associated with the execution of the duplicate process and notifying the first kernel that the duplicate process had halted upon a halt of the duplicate process; and
releasing resources in the second platform that is occupied by the duplicated process upon receiving a termination signal indicating that the process in the first platform has been removed,
wherein said creating, said loading, said scheduling, said freezing, and said releasing are performed by the second kernel.

5. The method of claim 4, the method further comprising:
subsequent to said scheduling and prior to said freezing, requesting an input/output (I/O) service to the first kernel upon the I/O service being invoked by the duplicate process in the second platform, wherein the I/O service is directed to an I/O device that is coupled to the first platform and hosted by the first kernel, and wherein said requesting is performed by the second kernel.

6. The method of claim 1, wherein the first platform is a high-end mainframe that is configured to provide kernel services for the hybrid system, wherein the second platform is a lower-end server that is configured to execute primarily computation-intensive workloads within the hybrid system.

7. The method of claim 1, wherein the process in the first platform is an executable format of an operating system of the second platform, wherein the process represents an instance of the operating system of the second platform within the first platform.

8. A computer program product, comprising a computer usable storage medium having a computer readable program code embodied therein, said computer readable program code containing instructions that when executed by a processor of a computer system implement a method for shifting workloads across platform in a hybrid system, the method comprising:

starting a process in a first platform of the hybrid system, wherein the process is executable in the second platform of the hybrid system, wherein a first kernel governs the first platform and a second kernel governs the second platform;

detecting that the process is not executable in the first platform;

requesting the second kernel to create, in the second platform, a duplicate process of the process in the first platform and receiving a notification that the duplicate process had been successfully created in the second platform from the second kernel;

stopping scheduling the process in the first platform responsive to receiving a signal from the second kernel indicating that the second platform schedules and executes the duplicate process in the second platform;

terminating the process in the first platform upon receiving an event trigger to terminate the process; and sending the second kernel a termination signal indicating that the process in the first platform has been removed, wherein said starting, said detecting, said requesting, said stopping, said terminating and said sending are performed by the first kernel.

9. The computer program product of claim 8, wherein said event trigger to terminate the process is selected from a group consisting of a halt notification and a kill command, wherein the halt notification is sent from the second kernel to indicate that the duplicate process in the second platform had halted, and wherein the kill command is received from a user of the hybrid system to terminate the process in the first platform.

10. The computer program product of claim 8, the method further comprising:
subsequent to said stopping and prior to said terminating, servicing an input/output (I/O) service request made by the duplicate process that is executing in the second platform, wherein the I/O service request is directed to an I/O device that is coupled to the first platform and hosted by the first kernel, wherein the I/O service request is communicated by the second kernel to the first kernel, and wherein said servicing is performed by the first kernel.

11. The computer program product of claim 8, the method further comprising:
responsive to said requesting, creating the duplicate process and subsequently sending the notification to the first kernel that the duplicate process had been successfully created in the second platform;
loading pages of the process in the first platform from the first kernel to the second kernel to execute the duplicate process in the second platform;
scheduling the duplicate process for execution and executing instructions of the duplicate process;
freezing data associated with the execution of the duplicate process and notifying the first kernel that the duplicate process had halted upon a halt of the duplicate process; and
releasing resources in the second platform that is occupied by the duplicated process upon receiving a termination signal indicating that the process in the first platform has been removed,
wherein said creating, said loading, said scheduling, said freezing, and said releasing are performed by the second kernel.

12. The computer program product of claim 11, the method further comprising:
subsequent to said scheduling and prior to said freezing, requesting an input/output (I/O) service to the first kernel upon the I/O service being invoked by the duplicate process in the second platform, wherein the I/O service is directed to an I/O device that is coupled to the first platform and hosted by the first kernel, and wherein said requesting is performed by the second kernel.

13. The computer program product of claim 8, wherein the first platform is a high-end mainframe that is configured to provide kernel services for the hybrid system, wherein the second platform is a lower-end server that is configured to execute primarily computation-intensive workloads within the hybrid system.

14. The computer program product of claim 8, wherein the process in the first platform is an executable format of an operating system of the second platform, wherein the process represents an instance of the operating system of the second platform within the first platform.

15. A computer system comprising a processor and a computer readable memory unit coupled to the processor, said memory unit containing instructions that when executed by the processor implement a method for shifting workloads across platform in a hybrid system, the method comprising:
starting a process in a first platform of the hybrid system, wherein the process is executable in the second platform of the hybrid system, wherein a first kernel governs the first platform and a second kernel governs the second platform;
detecting that the process is not executable in the first platform;
requesting the second kernel to create, in the second platform, a duplicate process of the process in the first platform and receiving a notification that the duplicate process had been successfully created in the second platform from the second kernel;
stopping scheduling the process in the first platform responsive to receiving a signal from the second kernel indicating that the second platform schedules and executes the duplicate process in the second platform;
terminating the process in the first platform upon receiving an event trigger to terminate the process; and
sending the second kernel a termination signal indicating that the process in the first platform has been removed,
wherein said starting, said detecting, said requesting, said stopping, said terminating and said sending are performed by the first kernel.

16. The computer system of claim 15, wherein said event trigger to terminate the process is selected from a group consisting of a halt notification and a kill command, wherein the halt notification is sent from the second kernel to indicate that the duplicate process in the second platform had halted, and wherein the kill command is received from a user of the hybrid system to terminate the process in the first platform.

17. The computer system of claim 15, the method further comprising:
subsequent to said stopping and prior to said terminating, servicing an input/output (I/O) service request made by the duplicate process that is executing in the second platform, wherein the I/O service request is directed to an I/O device that is coupled to the first platform and hosted by the first kernel, wherein the I/O service request is communicated by the second kernel to the first kernel, and wherein said servicing is performed by the first kernel.

18. The computer system of claim 15, the method further comprising:
responsive to said requesting, creating the duplicate process and subsequently sending the notification to the first kernel that the duplicate process had been successfully created in the second platform;
loading pages of the process in the first platform from the first kernel to the second kernel to execute the duplicate process in the second platform;
scheduling the duplicate process for execution and executing instructions of the duplicate process;
freezing data associated with the execution of the duplicate process and notifying the first kernel that the duplicate process had halted upon a halt of the duplicate process; and
releasing resources in the second platform that is occupied by the duplicated process upon receiving a termination signal indicating that the process in the first platform has been removed,
wherein said creating, said loading, said scheduling, said freezing, and said releasing are performed by the second kernel.

19. The computer system of claim 18, the method further comprising:
subsequent to said scheduling and prior to said freezing, requesting an input/output (I/O) service to the first kernel upon the I/O service being invoked by the duplicate process in the second platform, wherein the I/O service is directed to an I/O device that is coupled to the first platform and hosted by the first kernel, and wherein said requesting is performed by the second kernel.

20. The computer system of claim 15, wherein the first platform is a high-end mainframe that is configured to provide kernel services for the hybrid system, wherein the second platform is a lower-end server that is configured to execute primarily computation-intensive workloads within the hybrid system, and wherein the process in the first platform is an executable format of an operating system of the second platform, wherein the process represents an instance of the operating system of the second platform within the first platform.

* * * * *